United States Patent [19]

Turner et al.

[11] Patent Number: 4,575,723

[45] Date of Patent: Mar. 11, 1986

[54] FOLIAGE CLUTTER REJECTOR

[75] Inventors: Donald G. Turner; R. David Pogge, both of Ridgecrest, Calif.

[73] Assignee: The United States of America as represented by the Secretary of the Navy, Washington, D.C.

[21] Appl. No.: 349,884

[22] Filed: Feb. 16, 1982

[51] Int. Cl.[4] .............................................. G01S 13/52
[52] U.S. Cl. ....................................................... 343/7.7
[58] Field of Search .................... 343/7.7, 5 SA, 5 PD

[56] References Cited

U.S. PATENT DOCUMENTS

| Re. 30,288 | 5/1980 | Hackett | 343/5 PD |
| 3,665,443 | 5/1972 | Galvin | 343/7.7 |
| 3,845,461 | 10/1974 | Foreman | 343/7.7 |

Primary Examiner—Theodore M. Blum

Attorney, Agent, or Firm—Robert F. Beers; Joseph M. St. Amand; Thomas M. Phillips

[57] ABSTRACT

Signals from a balanced processor are sampled at a constant rate, integrated and then divided by the number of samples. Two averages are obtained: a positive half cycle average and a negative half cycle average. Over a long period, clutter contributions tend to cancel. Target dominance is thus enhanced by integrating over half cycles rather than full cycles. A single cycle bias finder adds half cycle averages to obtain a cycle bias. The single cycle bias is fed to the moving average integrator where it is integrated over an optimum number of cycles. Obtaining the moving average reduces the chance that a single cycle bias can cause the average to exceed the threshold while a radially moving target will be detected.

7 Claims, 2 Drawing Figures

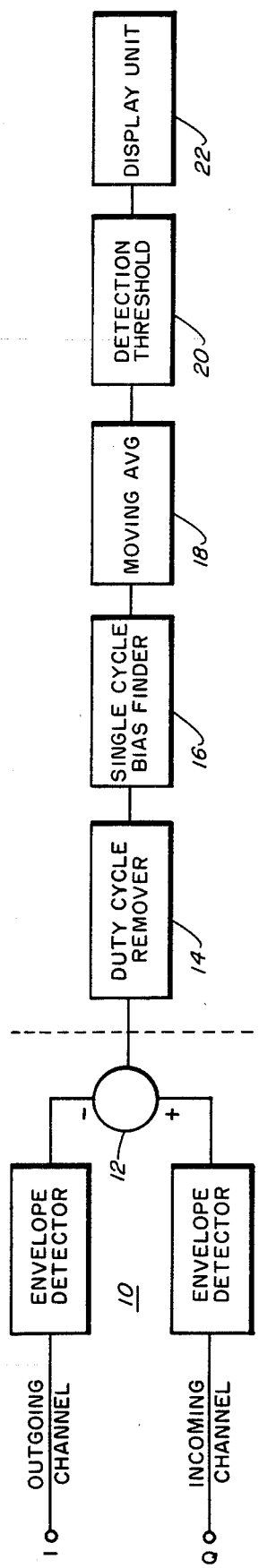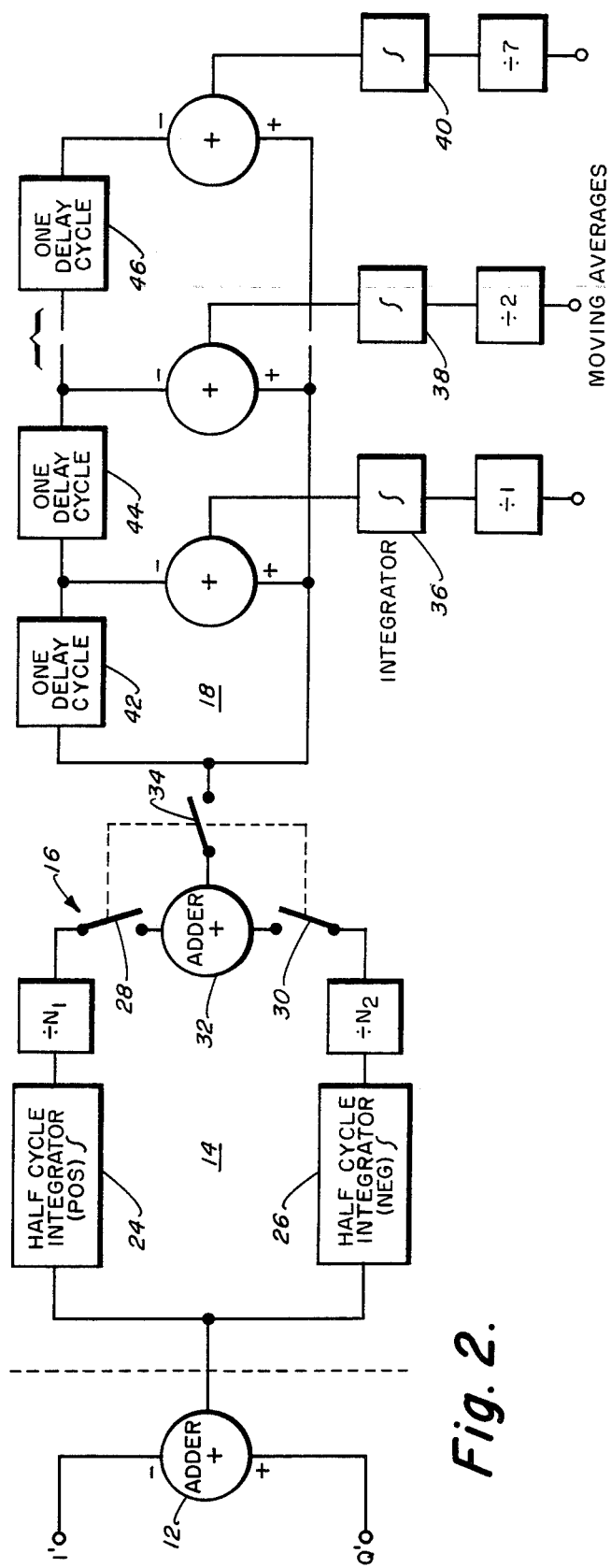

FOLIAGE CLUTTER REJECTOR

BACKGROUND OF THE INVENTION

The present invention relates to foliage-pentration surveillance radar and in particularly to a means of rejecting radar clutter from foliage while enhancing the radar return from a radially-moving target. In foliage-penetration surveillance radar systems such as that disclosed in U.S. patent application Ser. No. 332,397 filed Dec. 16, 1981, foliage moving back and forth generates radar clutter. Attempts to remove this clutter in the past used a two stage method. A balanced processor whose output is the difference or cancellation between the envelopes of detected inbound and outbound Doppler signals caused by inward and outward swaying foliage is integrated to average or smooth the difference signal. In theory, oscillating foliage would provide equal and canceling inbound and outbound signal energies, where a radially-moving target would provide a net signal energy out of the balanced processor and integrator. In this manner clutter was expected to be separated from the target return. In practice however the integrator following the balanced processor is often approximated by a low pass filter. The clutter voltage out of the balanced processor is not symetric, but has a semi-random or pseudo cycle form. The voltage fluctuates back and forth between positive and negative polarities at a rate dependent on clutter conditions. A true integrator can integrate a full cycle of idealized symetric clutter and give a zero output at the end of the cycle, where as a low-pass filter will have a residual voltage at the end of the cycle. This residual voltage wil be misconstrued as a target if it rises above the detection threshold.

SUMMARY OF THE INVENTION

The present invention provides apparatus means for rejecting radar clutter from foliage while enhancing the radar return from a radially-moving target. This is accomplished by integrating two half cycles of the Doppler signal representing movement of a target. At the end of the second half-cycle, each half intergal is divided by the number of samples it contains. It thus becomes apparent that averaging each half-cycle instead of a complete cycle prevents a low magnitude but long duration (many samples) half-cycle from minimizing the contribution of a high magnitude but short duration (few samples) half-cycle. A radially-moving target will increase the signal energy in one half-cycle while not adding to signal energy in the opposite polarity half-cycle. Over a short time clutter determines the dominate half-cycle in what seems like a random fashion. Over a long time (many half-cycles) the clutter contributions tend to cancel, leaving the moving target as dominate.

At the end of each cycle, the average of the positive half-cycle is added to the average of the negative half-cycle to obtain the single cycle bias. The half-cycle integrators are then returned to zero for a fresh start on the next half-cycle.

The single cycle bias at the end of each cycle is transferred to a moving average integrator where the biases are integrated over an optimum number of cycles and the resulting signal is fed to a threshold circuit. This reduces the chance that any given single cycle bias could exceed threshold. A radially-moving target will yield enough strong cycle biases to move the average above threshold and indicate a true target. Accordingly, an object of the invention is the provision of an improved apparatus for improving system sensitivity and false alarm rate in a foliage penetratioin surveillance radar.

Another object of the invention is the provision of apparatus or making possible the penetration of heavy foliage in the detection of any movement in a foliage penetration surveillance radar system.

Other objects, advantages and novel features of the invention will become apparent from the following detailed description of the invention when considered in conjunction with the accompanying drawings wherein:

FIG. 1 is an overall block diagram of an embodiment of the invention shown in conjunction with a foliage penetration surveillance radar.

FIG. 2 is a detailed circuit diagram of the foliage clutter rejector of FIG. 1.

Referring now to FIG. 1 wherein there is shown the two signals generated by a surveillance radar system for outgoing (target moving away from the radar) and incoming (targets moving toward the radar). As shown in FIG. 1, the output of balanced processor 10 will be either a positive or negative signal that are added in adder 12 to provide either a positive going signal (positive half-cycle) or negative going signals (negative half-cycle) coming in sequence. Duty cycle remover 14 makes the positive going signals and negative signals independent of each other. The single cycle bias finder 16 sums the two halves of the independent half-cycles from duty cycle remover 14 and provides a sum of the two half-cycles to a moving average integrator 18. The output of average integrator 18 is fed to a detection threshold circuit 20 which will provide an output to display unit 22 or to an alarm signal not shown when the input to threshold detector 20 exceeds a predetermined value.

Referring now to FIG. 2, duty cycle remover 14 consists of two half-cycle integrators 24 and 26. Integrator 24 integrates the inbound signal (positive half-cycle) and integrator 26 integrates the outbound signal (negative half-cycle) coming in sequence from summing circuit 12 of the balanced processor. The signals are sampled and integrated at a fixed sampling rate. Integration is for one complete pseudo-cycle(two half-cycles) of the signal coming from the balanced processor. At the end of the second half-cycle each half-cycle integral is divided by the number of samples it contains. This is represented schematically by the divide by $N_1$ and the divide by $N_2$ blocks in FIG. 2. This yields two averages (positive half-cycle average and negative half-cycle average). This averaging accomplishes removal of the duty cycle influence and yields two magnitude averages. Averaging each half-cycle instead of a complete cycle prevents a low magnitude long duration half-cycle from minimizing the contribution of a high magnitude, short duration half-cycle. Even with equal duration half-cycles, the average magnitude of a half-cycle would be "diluted" if averaged over a full cycle. To be effective as a surveillance radar, the target's influence on half-cycle average magnitude must not be diluted. A radially-moving target will increase the signal energy in one half-cycle while not adding to the signal energy in the opposite polarity half-cycle. The number of samples in a given half-cycle ($N_1$ and $N_2$ in FIG. 2) depend on how long the signal from the balanced processor stays either positive or negative.

Following the duty cycle remover 14 is the single cycle bias finder 16 and consists of two switches 28, 30 and a summing circuit 32. At the end of each complete cycle, the average of the positive half-cycle is added to the average of the negative half-cycle in summing circuit 32 to obtain the single cycle bias. At the end of the cycle when the two half-cycle averages have been added, the output of summing circuit 32 is fed to moving averager 18 while synchronously half-cycle integrators 24 and 26 are reset to zero for a fresh start on the next cycle.

The single cycle bias as stated above is transferred at the end of each cycle to the moving average integrator 18 where the signal is integrated and passed on to the threshold circuit 20 and display 22.

The output from summing circuit 32 is fed to a sequence of integrating circuits 36, 38 and 40 directly and through delay circuits 42, 44 and 46 respectfully, where it is added as delayed and undelayed signals to provide an average output which is an integration of the input wave form. Delay circuits 42, 44 and 46 may be shift registers. The purpose of moving averager 18 is to reduce the chance that any given single cycle bias will cause the average signal level to exceed threshold. A radially-moving target however will yield enough strong cycle biases to move the average above threshold.

Obviously many modifications and variations of the present invention are possible in the light of the above teachings. It is therefore to be understood that within the scope of the appended claims the invention may be practiced otherwise than as specifically described.

We claim:

1. A signal processing circuit for processing radar return signals to render them substantially independent of clutter caused by the presence of foliage in the target area comprising:
   first circuit means for separately integrating each half of said signals,
   second circuit means connected to said first circuit means for dividing each integrated half-cycle by the number of samples it contains to provide an average value of each half-cycle,
   third circuit means connected to said second circuit means for summing the average values obtained at the end of each cycle to provide a single cycle bias, and
   fourth circuit means connected to said third circuit means for integrating a predetermined number of said single cycle biases to provide an output signal that is substantially independent of clutter.

2. The processing circuit of claim 1 wherein said first circuit means includes a first integrating circuit for integrating the positive going portion of a single cycle of said signal and a second integrating circuit for integrating the negative going portion of said single cycle.

3. The processing circuit of claim 2 further including switching means for transferring said single cycle biases to said fourth circuit means.

4. The signal processing circuit of claim 1 wherein sid fourth circuit means further includes integrator circuit means for integrating a sufficient number of said single cycle biases to insure the cancelling of any bias level resulting from the presence of clutter and provide an output signal that indicates the presence of a target of interest.

5. A duty cycle remover circuit for a signal fluctuating back and forth between positive and negative polarities including:
   a first summing circuit for summing the positive half of one cycle of said signal at a predetermined sampling rate,
   a second summing circuit for summing the negative half of said one cycle of said signal at said predetermined sampling rate,
   divider circuit means connected to each of said summing circuits for dividing each summed half by the number of samples taken which is proportional to the length of time the signal remains either positive or negative for the one cycle.

6. The duty cycle remover circuit of claim 5 further including a third summing circuit connected to said divider circuit means for summing the outputs thereof to provide a single cycle bias signal.

7. A signal processing circuit for processing signals to render them independent of negative and positive excursions,
   first integrating circuit means for integrating the positive going portion of each cycle of said signal,
   second integrating circuit means for integrating the negative going portion of said signal,
   circuit dividing means for dividing each half integral by the number of samples it contains to provide averages of each half-cycle of said signal,
   summing means for summing the averages of one cycle to provide a single cycle bias signal.

* * * * *